United States Patent
Lee et al.

(10) Patent No.: US 8,134,552 B2
(45) Date of Patent: Mar. 13, 2012

(54) METHOD, APPARATUS, AND MEDIUM FOR EFFICIENTLY RENDERING 3D OBJECT

(75) Inventors: Keechang Lee, Yongin-si (KR);
Dokyoon Kim, Seongnam-si (KR);
Jeonghwan Ahn, Suwon-si (KR);
Seyoon Tak, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1087 days.

(21) Appl. No.: 11/525,037

(22) Filed: Sep. 22, 2006

(65) Prior Publication Data
US 2007/0070065 A1 Mar. 29, 2007

Related U.S. Application Data (60) Provisional application No. 60/719,586, filed on Sep. 23, 2005.

(30) Foreign Application Priority Data

Jan. 9, 2006 (KR) ........................ 10-2006-0002372

(51) Int. Cl.
*G06T 15/00* (2011.01)
*G06T 1/00* (2006.01)
*G06T 13/00* (2011.01)

(52) U.S. Cl. ........ 345/419; 345/418; 345/473; 345/474; 345/475

(58) Field of Classification Search .................. None
See application file for complete search history.

(56) References Cited

U.S. PATENT DOCUMENTS

| | | | |
|---|---|---|---|
| 5,977,977 A * | 11/1999 | Kajiya et al. | 345/418 |
| 6,104,405 A * | 8/2000 | Idaszak et al. | 345/427 |
| 6,532,015 B1 * | 3/2003 | Hayashi | 345/474 |
| 6,559,845 B1 * | 5/2003 | Harvill et al. | 345/473 |
| 6,563,503 B1 * | 5/2003 | Comair et al. | 345/473 |
| 6,628,286 B1 * | 9/2003 | Comair et al. | 345/473 |

* cited by examiner

*Primary Examiner* — Kee M Tung
*Assistant Examiner* — Sing-Wai Wu
(74) *Attorney, Agent, or Firm* — Staas & Halsey LLP (57) ABSTRACT

A method, apparatus and medium to render three-dimensional (3D) objects for 3D graphics. The method includes detecting the presence of a motion by performing local coordinate calculations with respect to each 3D object, performing global coordinate calculations with respect only to objects that each has a motion among the 3D objects, and rendering 3D objects for which local and global coordinate calculations have been performed.

15 Claims, 5 Drawing Sheets

METHOD, APPARATUS, AND MEDIUM FOR EFFICIENTLY RENDERING 3D OBJECT

CROSS-REFERENCE TO RELATED APPLICATIONS

This application claims the benefit of U.S. Provisional Patent Application No. 60/719,586, filed on Sep. 23, 2005, in the U.S. Patent and Trademark Office, and Korean Patent Application No. 10-2006-0002372, filed on Jan. 9, 2006, in the Korean Intellectual Property Office, the disclosures of which are incorporated herein in its entirety by reference.

BACKGROUND OF THE INVENTION

1. Field of the Invention

The present invention relates to three-dimensional (3D) graphics. More particularly, to a method and apparatus for performing local coordinate calculations, global coordinate calculations, and rendering of 3D objects using fewer calculations.

2. Description of the Related Art

Since 3D graphics technology has developed, it has also been applied to computer games, and thus 3D games have become widely popular. In the case of a 3D game, there are a large number of 3D objects that move in a 3D world, where each object has a characteristic motion. Some objects exist without moving for a long while, while other objects move continuously in the 3D world.

In order to display 3D objects having a variety of types of characteristic motions, calculations for coordinate transforms on a local coordinate system and a global coordinate system and rendering should be performed. Local coordinates are coordinates relative only to each 3D object, in which coordinates are determined relative to the respective 3D object. Meanwhile, the global coordinates are commonly applied to all 3D objects.

In order to display 3D objects existing in a 3D world, local coordinate calculations for expressing the position change of every 3D object at local coordinates should be performed, global coordinate calculations for applying the position change at local coordinates to the global coordinates should be performed, and then, rendering of 3D objects should be performed.

Accordingly, in the case of a 3D game having numerous 3D objects, a large amount of calculations are required for the local and global coordinate calculations, and thus the performance of the 3D game is lowered.

SUMMARY OF THE INVENTION

Accordingly, it is an aspect of the present invention to provide a method of expressing three-dimensional (3D) objects when rendering of the 3D objects is performed for 3D graphics, in which the amount of calculations required for global coordinate calculation is reduced so that rendering of the 3D objects can be performed efficiently, and a method and apparatus for rendering 3D objects using the 3D object expressing method.

Additional aspects and/or advantages of the invention will be set forth in part in the description which follows and, in part, will be apparent from the description, or may be learned by practice of the invention.

The foregoing and/or other aspects of the present invention are achieved by providing a method of efficiently rendering three-dimensional (3D) objects for 3D graphics including detecting a presence of a motion of 3D objects by performing local coordinate calculations with respect to each 3D object, performing global coordinate calculations with respect to only 3D objects each having a motion among the 3D objects; and rendering 3D objects for which the local and global coordinate calculations have been performed.

The detecting of the presence of a motion includes determining whether the 3D object is a dynamic object, wherein when the 3D object is a dynamic object, determining whether at least one of transforms forming the 3D object includes a motion, wherein when at least one of the transforms includes a motion, detecting the 3D object as a 3D object having a motion.

The detecting of the presence of a motion further includes compiling an update list including the 3D objects determined to be dynamic objects; and compiling a resynch list which includes a 3D object including at least one of the transforms each having a motion, among the 3D objects included in the update list.

The transforms include a next transform or a child transform, forming a tree structure.

In the performing of the global coordinate calculations, the global coordinate calculations are performed with respect to only transforms each having a motion and respective child transforms.

The detecting of the presence of a motion further includes setting a flag to 'on' in each transform having a motion.

The performing of the global coordinate calculation includes referring to the flag of each of the transforms forming the 3D object, and performing a global coordinate calculation with respect to the transforms in which the flag is set to 'on', and respective child transforms.

In an aspect of the present invention, the 3D objects are divided into ordinary objects, animation objects, and skinned animation objects, and an animation object is expressed by inheriting properties of an ordinary object, and a skinned animation object is expressed by inheriting properties of an animation object.

Another aspect of the present invention is achieved by providing an apparatus for efficiently rendering 3D objects for 3D graphics including a local coordinate calculation unit to perform local coordinate calculations with respect to each 3D object, a motion detection unit to detect the presence of a motion of each of the 3D objects according to a result of the local coordinate calculation, a global coordinate calculation unit to perform global coordinate calculations with respect to only 3D objects each having a motion among the 3D objects, and a rendering unit to render 3D objects for which the local and global coordinate calculations have been performed.

The motion detection unit includes an object determination unit to determine whether the 3D object is a dynamic object, and a transform determination unit, wherein when the 3D object is a dynamic object and at least one of transforms forming the 3D object has a motion, detecting the 3D object as a 3D object having a motion.

The motion detection unit further includes a storage unit to store an update list including the 3D objects determined to be an dynamic object, and a resynch list including a 3D object having at least one of transforms each having a motion, among the 3D objects included in the update list.

The transforms include a next transform or a child transform, forming a tree structure. The global coordinate calculation unit performs the global coordinate calculations with respect to only transforms each having a motion and respective child transforms.

The transform determination unit sets a flag to 'on' in each transform having a motion.

The global coordinate calculation unit includes a flag reference unit to refer to the flag of each of the transforms forming the 3D object, and a calculation unit to perform a global coordinate calculation with respect to the transforms in which the flag is set to 'on', and the respective child transforms.

The 3D objects is divided into ordinary objects, animation objects, and skinned animation objects, and an animation object is expressed by inheriting properties of an ordinary object, and a skinned animation object is expressed by inheriting properties of an animation object.

Another aspect of the present invention is achieved by providing data structure of a transform to expresseach of a plurality of transforms forming a 3D object, the data structure including a global coordinate field having information on a position of the transform in a global coordinate system, a local coordinate field having information on a position of the transform in a local coordinate system, and a flag having information on whether the position of the transform is changed in the global coordinate system or in the local coordinate system.

Another aspect of the present invention is achieved by providing a computer readable recording medium having embodied thereon a computer program for executing the methods of efficiently rendering 3D objects, and the data structure of the transforms.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
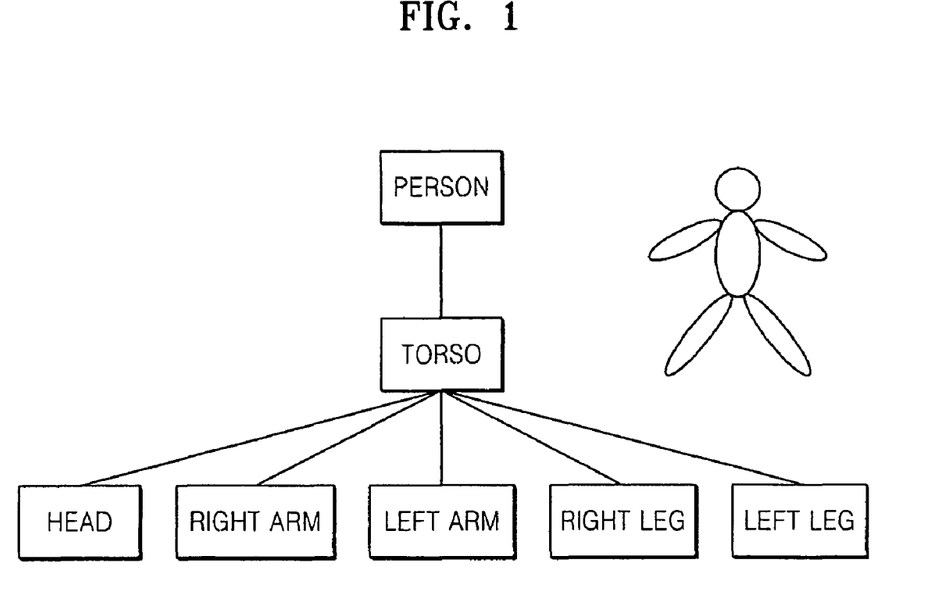
FIG. 1 illustrates a method of expressing a three-dimensional (3D) object using a plurality of transforms according to an embodiment of the present invention.

FIG. 1 illustrates a method of expressing a three-dimensional (3D) object using a plurality of transforms according to an embodiment of the present invention.

A 3D object comprises a sum of transforms that are sub unit elements.

As illustrated in FIG. 1, in order to express a person, (i.e., one object), each part of the human body (i.e., the torso, head, right arm, left arm, right leg, and left leg) becomes a transform. In order to express various animated motions of a 3D object and each transform, the transforms comprise a tree structure.

The transforms are divided into a 'ShapeTransform' for expressing a shape, a 'HelperTransform' for making a current position known to the outside, and a 'BoneTransform' for expressing joint value information.

In a method of expressing a 3D object according to an embodiment of the present invention, the 3D object can be expressed as codes of a class structure as follows:

```
class Object
{
    AABB m_bv;
    Transform *m_tree;
    seBool m_dynamic;
    Matrix m_tm;
}
```

Here, m_bv is a field for defining a boundary box surrounding the object, and *m_tree is a field for defining transforms of a tree structure forming the object. Also, m_dynamic is a field for defining whether the object is an animation object or a static object, and m_tm is a field indicating the position of the object in the global coordinate system.

Figure 2:
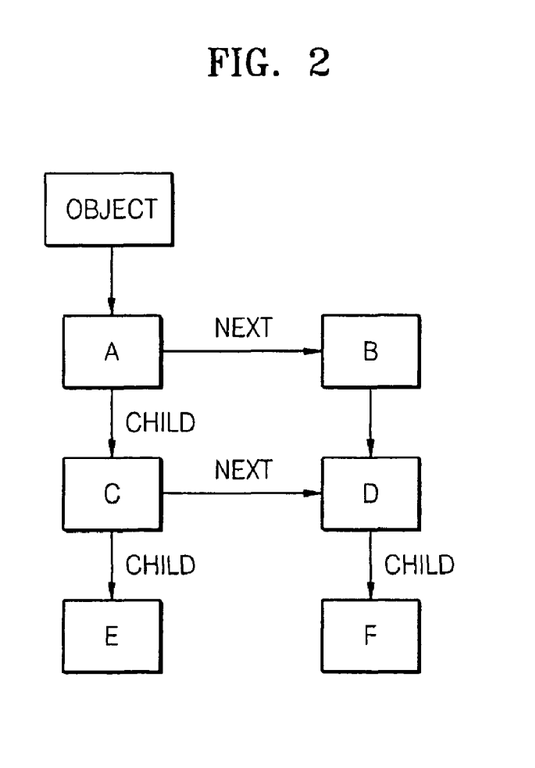
FIG. 2 illustrates a tree structure of transforms forming a 3D object according to an embodiment of the present invention.

FIG. 2 illustrates a tree structure of transforms forming a 3D object according to an embodiment of the present invention. The transforms are connected to each other as either a next transform or a child transform. The 3D object illustrated in FIG. 2 is composed of 6 transforms, A, B, C, D, E, and F, and the transforms are connected to each other as either a next transform or a child transform. As shown in FIG. 2, B is the next transform of A, and D is the next transform of C. Each of the next transforms have the same status as that of the transform to which the next transform is connected.

Also, as shown in FIG. 2, C is a child transform of A, E is a child transform of C, and F is a child transform of D. Each of the child transforms comprises a status dependent on the transform to which the child transform is connected, and when the connected transform comprises a motion, the child transform will also comprise a motion.

When an object is formed to be a tree of a next-child structure as shown in FIG. 2, for example, a transform comprises a single next pointer and a single child pointer.

In a method of expressing the transform according to an embodiment of the present invention, the transform can be expressed as codes of a class structure as follows:

```
class Transform
{
    Tid m_id;
    seUInt32 m_flags;
    Transform *m_next;
    Transform *m_child;
    seMatrix m_global;
    seMatrix m_local;
    seUInt16 m_transformID;
    seUInt16 m_morphID;
}
```

Here, m_id is a field indicating an identification (ID) of the transform, and m_flags is a field indicating a check bit to reduce the amount of calculations, which will be explained in detail later. *m_next is a field indicating a connection pointer to a next transform, and *m_child is a field indicating a connection pointer to a child transform. m_global is a field indicating a position in the global coordinate system of the transform, and m_local is a field indicating a position in the local coordinate system of the transform. m_transformID is an ID of a transform for animation, and m_morphID is an ID of a transform for morphing.

In an embodiment of the present invention, by using an object-oriented method based upon the characteristics of the motion of each object, 3D objects are broken down into ordinary objects, animation objects, and skinned animation objects.

An ordinary object is an object having no motion. An animation object is an object having a simple motion like keyframe animation or morphing. A skinned animation object is an object having a motion of a complicated shape, including a process of surface processing with joint movement. Instead of defining the respective objects independently, these objects are defined such that animation objects are defined based on the defined ordinary objects, and skinned animation objects are defined based on the defined animation objects,. By using the object-oriented method, redundancy can be avoided and efficiency can be increased in the process of defining objects.

According to an embodiment of the present invention, an ordinary object is expressed in a class structure as follows:

```
class Object
{
    AABB m_bv;
    Transform *m_tree;
    seBool m_dynamic;
    Matrix m_tm;
}
```

According to an embodiment of the present invention, an animation object is expressed by inheriting properties of the ordinary object based on the ordinary object, and adding information required for animation as follows:

```
class AnimatedObject : public Object
{
    struct Animation
    {
        seReal m_mixCoeff;
        seReal m_animationIndex;
        seReal m_virtualParam;
    };
    anim::FrameManager const *m_frameManager;
    seUInt32 m_maxNumAnimations;
    seUInt32 m_numAnimations;
    Animation *m_animations;
}
```

According to an embodiment of the present invention, a skinned animation object is expressed by inheriting the properties of the animation object based on the animation object, and adding information required for skinning as follows:

```
class SkinnedObject : public AnimatedObject
{
```

```
struct SkinLink
{
    seBaseSkin *m_skin;
    ShapeTransform *m_shapeTransform;
};
seInt32 m_numSkins;
SkinLink *m_skinLinks;
}
```

Here, skinning is a process of covering skin on the joint object, and is performed after position information of each joint is determined as the result of joint movements.

Figure 3A:
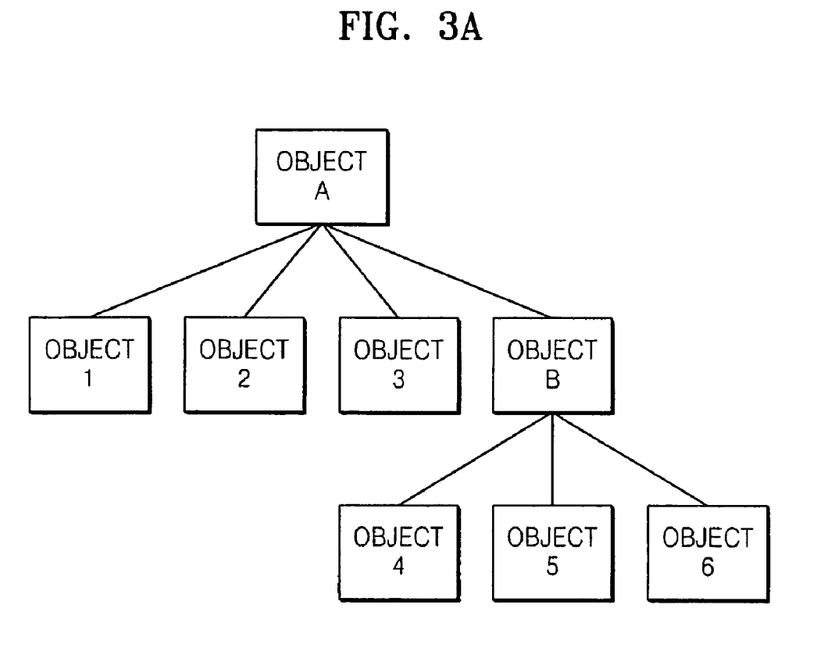
FIGS. 3A and 3B illustrate a method of grouping a plurality of 3D objects according to an embodiment of the present invention.
Figure 3B:
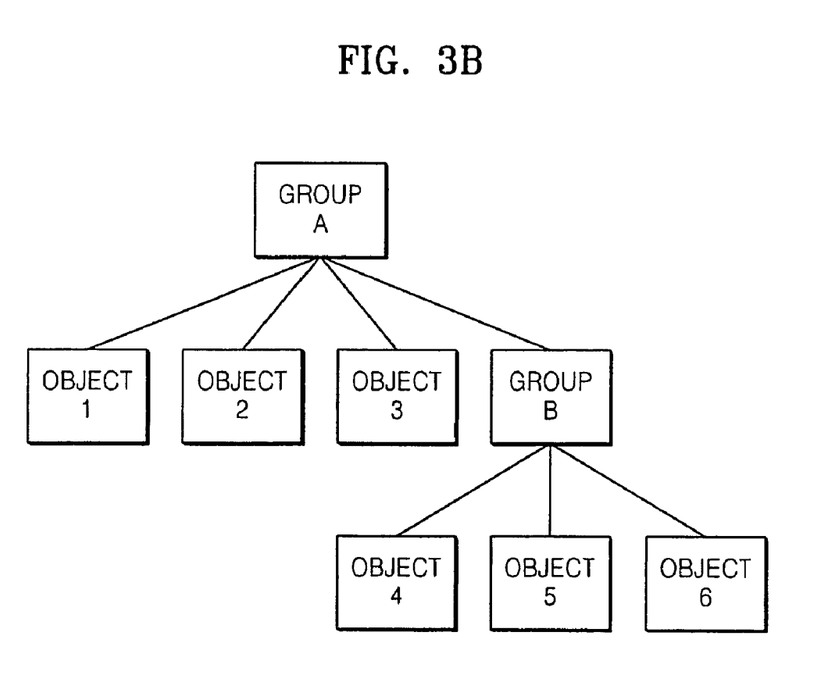

FIGS. 3A and 3B each illustrate a method of grouping a plurality of 3D objects according to an embodiment of the present invention. By grouping objects having identical motions or objects requiring identical management, jobs for the objects can be efficiently performed.

FIG. 3A illustrates an embodiment of a method of grouping objects in which an ordinary object is made to include other ordinary objects so that the objects can be grouped. For example, as shown in FIG. 3A, Object A includes Objects 1-3 and Object B, and Object B includes Objects 4-6. That is, according to this embodiment of the present invention, an ordinary object is permitted to have information about other objects so that grouping can be performed. According to this embodiment of the present invention, when one object has information about other objects, the method of expressing 3D objects can be expressed as follows:

```
class Object
{
    AABB m_bv;
    seUInt16 m_num_obj;
    Object *m_obj;
    Transform *m_tree;
    seBool m_dynamic;
    Matrix m_tm;
}
```

Here, m_num_obj is a field indicating the number of objects of a group to which the object belongs, and *m_obj is a field indicating the pointer for expressing the group. This embodiment of the method of grouping objects has an advantage in that by only defining a new field in the definition of an existing object, the grouping of objects is enabled, without defining a new expression.

FIG. 3B illustrates a method of grouping objects according to another embodiment of the present invention, in which a group comprising objects is newly defined and a new expression for the group is defined and used. For example, as shown in FIG. 3B, Group A includes Objects 1-3 and Group B, and Group B includes Objects 4-6. According to this embodiment of the present invention, the method of expressing a newly defined group can be expressed as follows:

```
class Group
{
    AABB m_bv;
    seUInt16 m_num_obj;
    Object *m_obj;
    seUInt16 m_num_group;
    Group *m_group;
    seBool m_dynamic;
    Matrix m_tm;
}
```

Here, m_bv is a field defining a boundary box surrounding the group, and m_num_obj is a field defining a number of objects belonging to the group. *m_obj is a pointer field for expressing objects belonging to the group. m_num_group is a field indicating a number of subgroups in the group, *m_group is a pointer field for expressing subgroups (i.e., Group B) in the group, m_dynamic is a field for expressing whether the group is a state or a dynamic group, and m_tm is a field indicating the position of the group.

According to this embodiment of the present invention, the method of grouping objects uses a new structure for the group, which is distinguished from ordinary objects. Thus, when the group is used, confusion can be prevented and use of the group is clear in light of the external tree structure.

Figure 4:
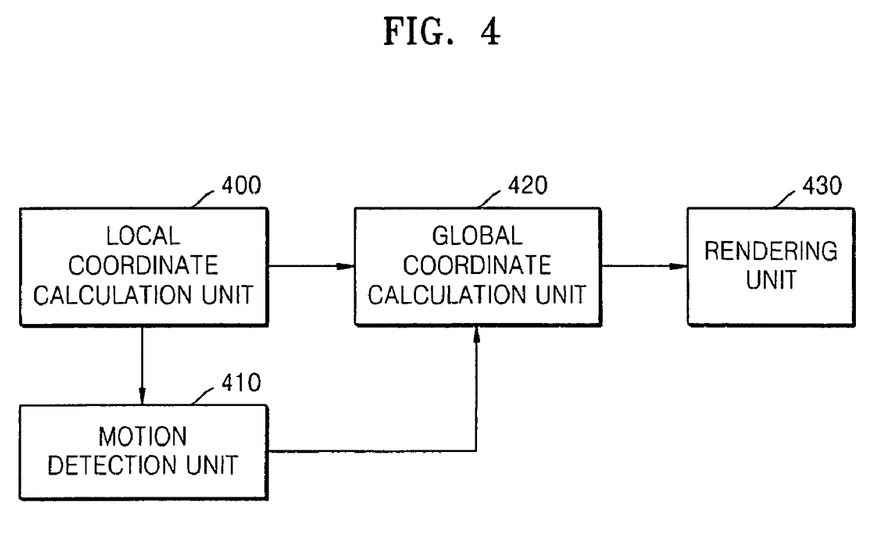
FIG. 4 is a block diagram illustrating a structure of an apparatus for efficiently rendering a 3D object according to an embodiment of the present invention.

FIG. 4 is a block diagram illustrating a structure of an apparatus for efficiently rendering a 3D object, according to an embodiment of the present invention. The apparatus comprising a local coordinate calculation unit 400, a motion detection unit 410, a global coordinate calculation unit 420, and a rendering unit 430. The operation of the apparatus illustrated in FIG. 4, will now be explained in relation to the flowchart illustrating a method of efficiently rendering a 3D object according to an embodiment of the present invention as shown in FIG. 6.

Figure 6:
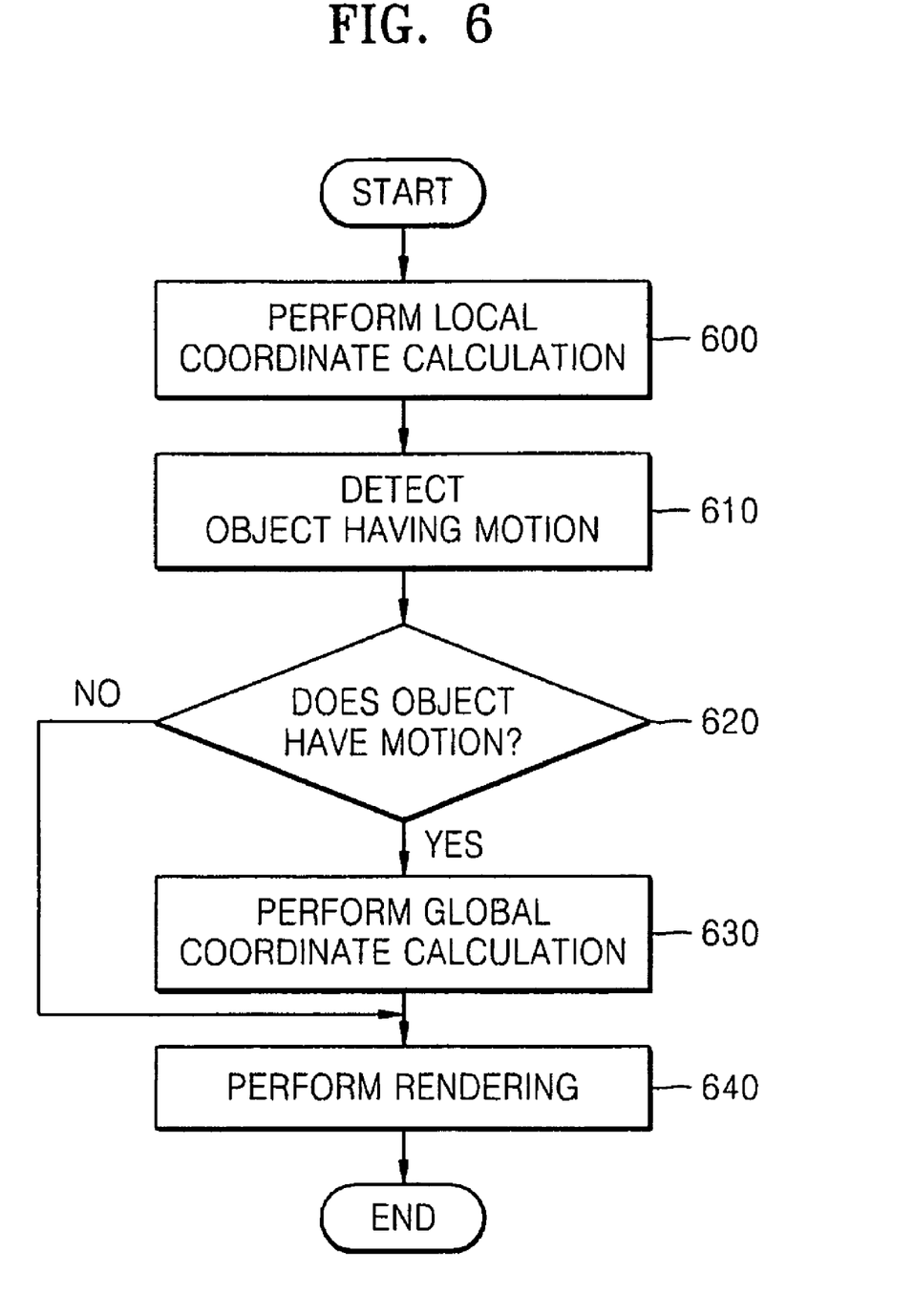
FIG. 6 is a flowchart illustrating a method of efficiently rendering a 3D object according to an embodiment of the present invention.

As shown in FIG. 6, at operation 600, the local coordinate calculation unit 400 performs local coordinate calculations in order to express position changes in the local coordinate system with respect to motions of each 3D object. The motion of the 3D object is determined according to an artificial intelligence or user input. The local coordinates are coordinates of only those 3D objects that are based on the 3D object. According to the local coordinate calculation of the local coordinate calculation unit 400, the position of the local coordinates of transforms, which each have a motion among transforms forming each object, is changed.

According to the result of the local coordinate calculations in operation 600, the process moves to operation 610, where the motion detection unit 410 detects 3D objects each having a motion, that is, each 3D object in which at least one transform among transforms belonging to the 3D object has a motion, among all the 3D objects.

Figure 5:
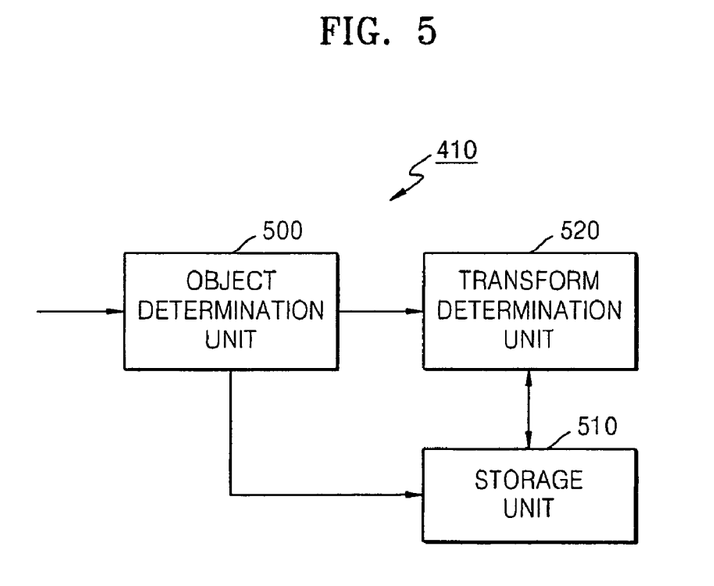
FIG. 5 is a block diagram of a motion detection unit illustrated in FIG. 4 according to an embodiment of the present invention.

FIG. 5 is a block diagram of the motion detection unit 410 illustrated in FIG. 4 according to an embodiment of the present invention. The motion detection unit 410 comprises an object determination unit 500, a storage unit 510 and a transform determination unit 520. The operation of the motion detection unit 410 illustrated in FIG. 5 will now be explained with reference to the flowchart illustrating the detecting of a motion (i.e., operation 610 of FIG. 6) illustrated in detail in FIG. 7, according to an embodiment of the present invention.

Figure 7:
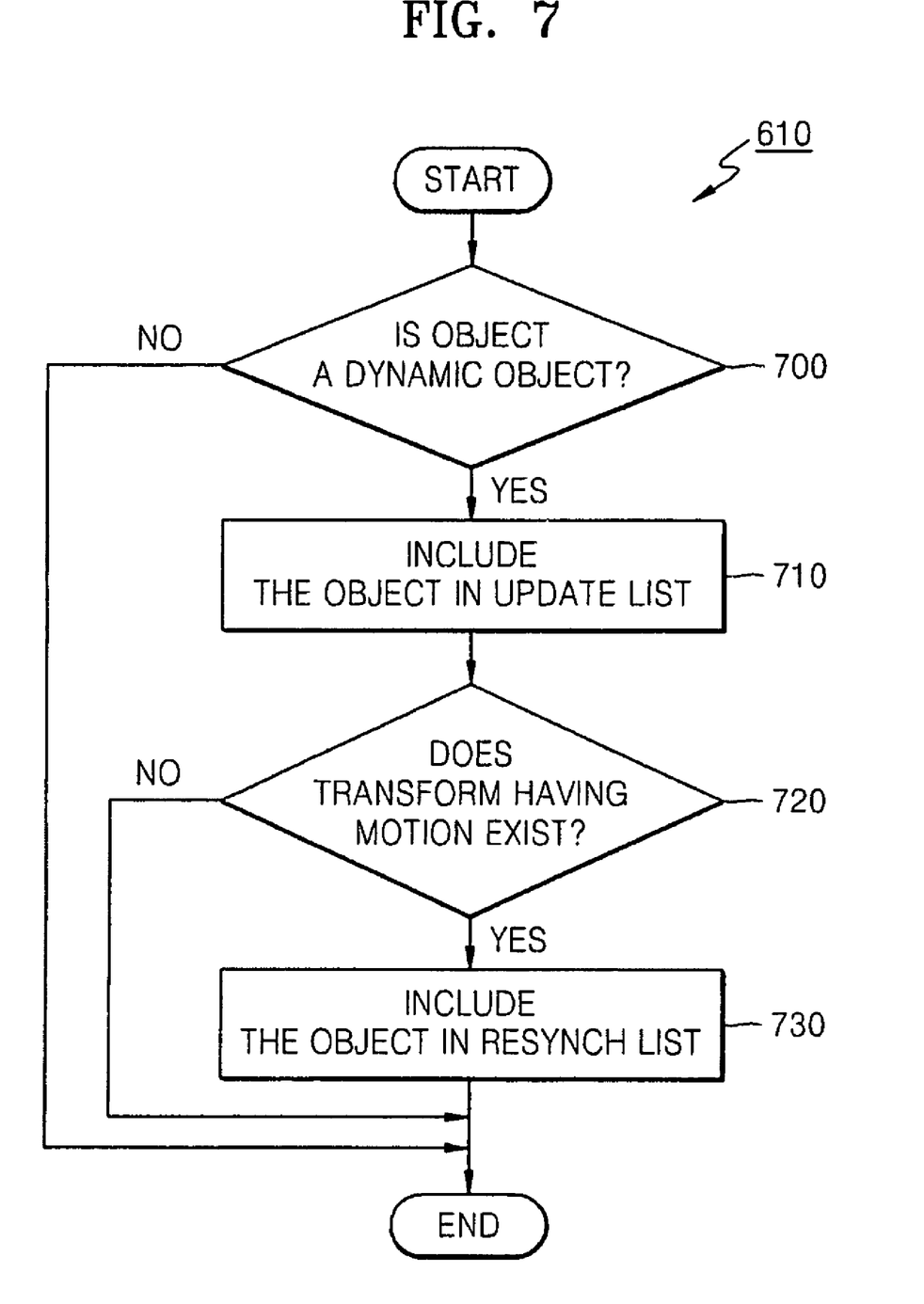
FIG. 7 is a flowchart illustrating the detecting of a motion as shown in FIG. 6 according to an embodiment of the present invention.

At operation 700, the object determination unit 500 determines whether a 3D object is a dynamic object or a static object. In order to make this determination, m_dynamic which is a field defining whether an object is a dynamic object or a motionless static object can be referred to among the fields described above, in relation to the embodiment of the method of expressing objects.

When it is determined in operation 700, that the 3D object is a static object, it is determined that both the 3D object and transforms forming the 3D object have no motion.

On the other hand, when it is determined in operation 700, that the 3D object is a dynamic object, the process moves to operation 710, where the 3D object is included in an update list stored in the storage unit 510 (shown in FIG. 5).

From operation 710, the process moves to operation 720, where with respect to only the 3D objects included in the update list, the transform determination unit 520 (shown in FIG. 5) determines whether each transform forming the 3D object includes a motion.

According to an embodiment of the present invention, a method of expressing the transform is as follows:

```
class Transform
{
    Tid m__id;
    seUInt32 m__flags;
    Transform *m__next;
    Transform *m__child;
    seMatrix m__global;
    seMatrix m__local;
    seUInt16 m__transformID;
    seUInt16 m__morphID;
}
```

If the transform includes a motion, m_local, which expresses the position of the transform in the local coordinate system as a matrix, is changed according to the local coordinate calculation. At the same time, when it is determined in operation 720, that the 3D object including the transform includes a motion, the process moves to operation 730, where the 3D object is included in a resynch list stored in the storage unit 510.

According to the method described above, objects each having a motion, that is, 3D objects each including at least one transform having a motion, among all the 3D objects, are included in the resynch list.

Also, the transform determination unit 520 turns on the m_flags of a transform in which m_local of the transform is changed because of the presence of a motion of the transform. Accordingly, the m_flags of transforms each having a motion are turned on.

From operation 610 shown in FIGS. 6 and 7, the process then moves to operation 620 shown in FIG. 6, where the global coordinate calculation unit 420 confirms whether a 3D object has a motion, and upon confirmation thereof in operation 620, the process moves to operation 630 where the global coordinate calculation unit 420 performs global coordinate calculations with respect to only objects that each include a motion. The global coordinate calculation is used to apply the motion of an object or a transform in the local coordinate system to a display screen. According to the global coordinate calculation, m_global that expresses the positions of the transforms each having a motion in the global coordinate system is changed.

The global coordinate calculation unit 420 performs a global coordinate calculation only for transforms that each include a motion among transforms forming each object having a motion. The global coordinate calculation unit 420 confirms the presence of a motion of a transform by referring to the m_flags. That is, by referring to the m_flags, the global coordinate calculation unit 420 perform the global coordinate calculations with respect to only transforms in which m_flags are turned on. Also, since if any one transform has a motion, a child transform dependent on the transform also includes a motion, the global coordinate calculation unit 420 performs global coordinate calculations with respect to the transforms in which m_flags are turned on, and the respective child transforms.

An embodiment of the operation of the global coordinate calculation unit 420 shown in FIG. 4, will now be explained with reference to the method of expressing an object in a tree structure as illustrated in FIG. 2. Here, the global coordinate calculation unit 420 refers to the m_flags and performs global coordinate calculation in order of B, A, D, F, C, and E.

If the m_flags of transform D is turned on among the transforms illustrated in FIG. 2, the global coordinate calculation unit 420 confirms that the m_flags of transforms B and A are off, and does not perform a global coordinate calculation. The global coordinate calculation unit 420 confirms that the m_flags of transform D is on and performs a global coordinate calculation with respect to transform D and then, also performs global coordinate calculations with respect to transform F, which is a child transform of transform D. The global coordinate calculation unit 420 confirms that the m_flags of transforms C and E are off and does not perform global coordinate calculation. Accordingly, the global coordinate calculation unit 420 performs global coordinate calculations with respect to the two transforms, D and F, among 6 transforms forming the object having a motion.

When the global coordinate calculations performed in operation 630 shown in FIG. 6, with respect to the objects that each include a motion, and the global coordinate calculations with respect to the transforms that each include a motion are completed, the process moves to operation 640, where the rendering unit 430 performs rendering in order to apply a light source, the calculated positions of objects in the global coordinate system, and colors so as to display the 3D objects on a display screen.

Since static objects or 3D objects having no motion in the local coordinate system have no position changes in the global coordinate system, rendering of the motionless objects are directly performed, without a global coordinate calculation being performed.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to the method and apparatus for efficiently rendering 3D objects of the present invention as described above, global coordinate calculations are performed with respect to only objects having motions among the 3D objects. More specifically, only transforms having motions among transforms that form 3D objects. In this way, in the rendering of the 3D objects, the amount of computation required can be reduced, and thus, the performance of 3D graphics in 3D games having numerous 3D objects appearing with many motions can be greatly enhanced.

Although a few embodiments of the present invention have been shown and described, it would be appreciated by those skilled in the art that changes may be made in these embodiments without departing from the principles and spirit of the present invention, the scope of which is defined in the claims and their equivalents.

What is claimed is:

1. A method of efficiently rendering three-dimensional (3D) objects for 3D graphics comprising:
   using a computing device to perform,
   determining whether a 3D object is a dynamic object with respect to each of the 3D objects;
   compiling the 3D objects determined to be dynamic objects into an update list;
   determining whether at least one of transforms forming the 3D object included in the update list includes a motion by performing local coordinate calculations;
   compiling the 3D objects determined to include the at least one of transforms each including the motion into a resynch list;
   performing global coordinate calculations with respect only to at least one of the transforms each including the motion forming the 3D object included in the resynch list and respective child transforms; and
   rendering 3D objects for which local and global coordinate calculations have been performed.

2. The method of claim 1, wherein the transform is a next transform or a child transform, forming a tree structure.

3. The method of claim 1, wherein the detecting of the presence of a motion further comprises:
   setting a flag to 'on' in each transform including a motion.

4. The method of claim 3, wherein the performing of the global coordinate calculations comprises:
   referring to the flag of each of the transforms forming the 3D object; and
   performing global coordinate calculations with respect to the transforms in which the flag is set to 'on', and respective child transforms.

5. The method of claim 1, wherein the 3D objects are divided into ordinary objects, animation objects, and skinned animation objects, wherein an animation object is expressed by inheriting properties of an ordinary object, and a skinned animation object is expressed by inheriting properties of an animation object.

6. The method of claim 1, wherein the performing of local coordinate calculations is performed to express position changes with respect to motions of each 3D object.

7. The method of claim 1, wherein the motion of the 3D object is determined according to an artificial intelligence or user input.

8. An apparatus for efficiently rendering 3D objects for 3D graphics comprising:
   a local coordinate calculation unit to perform local coordinate calculations with respect to each 3D object included in an update list;
   an object determination unit to determine whether the 3D object is a dynamic object with respect to each 3D object;
   a transform determination unit to determine at least one of transforms forming the 3D object, which determined to be the dynamic object, includes a motion;
   a storage unit to store the update list including the 3D objects each determined to be the dynamic object, and a resynch list including a 3D object having at least one of transforms each having a motion, among the 3D objects included in the update list;
   a global coordinate calculation unit to perform global coordinate calculations with respect only to at least one of the transforms each including the motion forming the 3D object included in the resynch list and respective child transforms; and
   a rendering unit, implemented by a computing device, to render 3D objects for which local and global coordinate calculations have been performed.

9. The apparatus of claim 8, wherein the local coordinate calculation unit performs local coordinate calculations in order to express position changes with respect to motions of each 3D object.

10. The apparatus of claim 8, where the motion of the 3D object is determined according to an artificial intelligence or user input.

11. The apparatus of claim 8, wherein the transform is a next transform or a child transform, forming a tree structure.

12. The apparatus of claim 8, wherein the transform determination unit sets a flag to 'on' in each transform including a motion.

13. The apparatus of claim 12, wherein the global coordinate calculation unit comprises:
- a flag reference unit to refer to the flag of each of the transforms forming the 3D object; and
- a calculation unit to perform global coordinate calculations with respect to the transforms in which the flag is set to 'on', and respective child transforms.

14. The apparatus of claim 8, wherein the 3D objects are divided into ordinary objects, animation objects, and skinned animation objects, and wherein an animation object is expressed by inheriting properties of an ordinary object, and a skinned animation object is expressed by inheriting properties of an animation object.

15. A non-transitory computer readable recording medium for storing and executing a computer program for to perform a method of efficiently rendering three-dimensional (3D) objects for 3D graphics, the method comprising:
- determining whether a 3D object is a dynamic object with respect to each of the 3D objects;
- compiling the 3D objects determined to be dynamic objects into an update list;
- determining whether at least one of transforms forming the 3D object included in the update list includes a motion by performing local coordinate calculations;
- compiling the 3D objects determined to include the at least one of the transforms each including the motion into a resynch list;
- performing global coordinate calculations with respect only to at least one of the transforms each including the motion forming the 3D object included in the resynch list and respective child transforms; and
- rendering 3D objects for which local and global coordinate calculations have been performed.

\* \* \* \* \*

UNITED STATES PATENT AND TRADEMARK OFFICE
CERTIFICATE OF CORRECTION

| | | |
|---|---|---|
| PATENT NO. | : 8,134,552 B2 | Page 1 of 1 |
| APPLICATION NO. | : 11/525037 | |
| DATED | : March 13, 2012 | |
| INVENTOR(S) | : Keechang Lee et al. | |

It is certified that error appears in the above-identified patent and that said Letters Patent is hereby corrected as shown below:

Column 11, Line 17, In Claim 15, after "program" delete "for".

Signed and Sealed this
Twenty-second Day of May, 2012

David J. Kappos
*Director of the United States Patent and Trademark Office*